May 14, 1963 R. L. LANDON 3,089,347
FILTER
Filed June 12, 1961
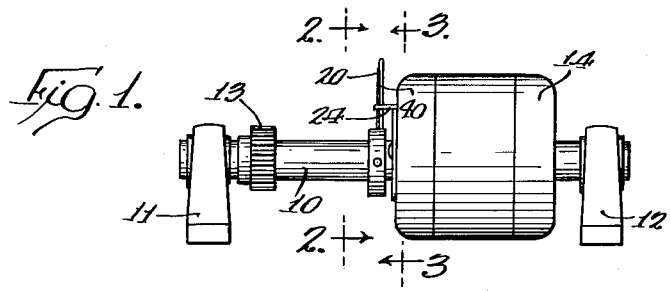
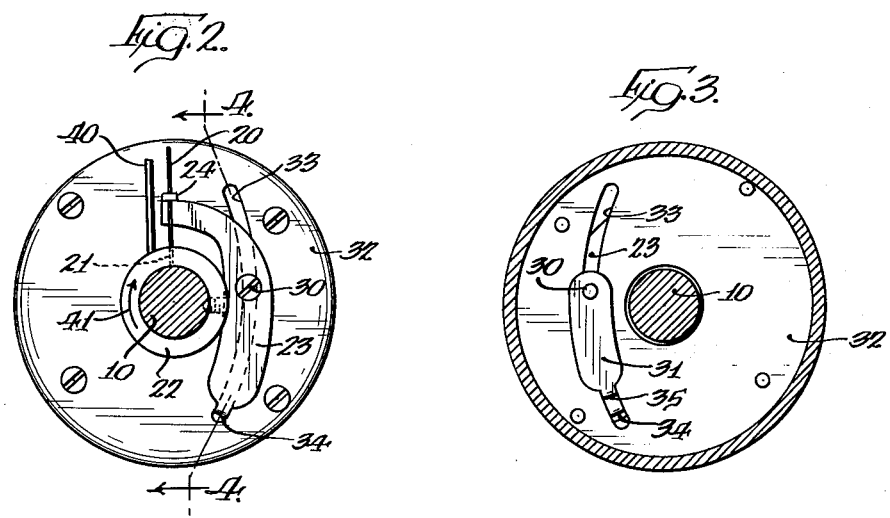
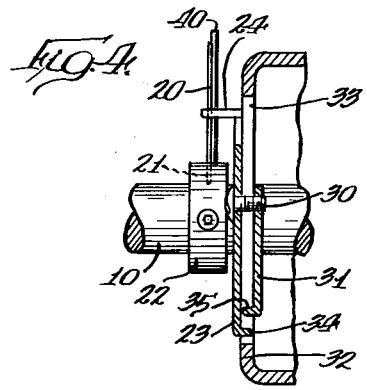
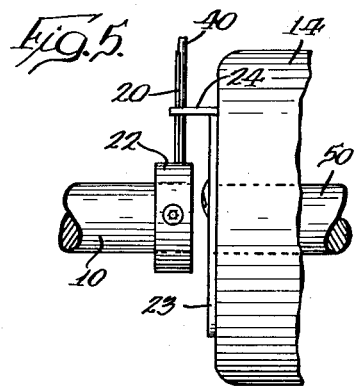
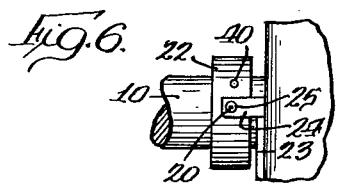
INVENTOR.
Robert L. Landon
BY Hofgren, Brady,
Wegner, Allen & Stellman
Attys 3,089,347
Patented May 14, 1963

1

3,089,347
FILTER
Robert L. Landon, Glenview, Ill., assignor to Warwick Manufacturing Corporation, a corporation of Delaware
Filed June 12, 1961, Ser. No. 116,426
3 Claims. (Cl. 74—574)

This invention relates to a filter and more particularly to a filter connected between parts for reducing flutter or the transmission of vibration.

An object of this invention is to provide a new and improved filter for absorbing vibration or transmission irregularities.

Another object of the invention is to provide a new and improved filter for absorbing vibration and shock as well as irregularities in a drive transmission in which the filter provides maximum effectiveness by being tunable to the frequency of the vibration, shock or other irregularities encountered.

A further object of the invention is to have a motion transmission system having a shaft, a member rotatable coaxially with the shaft and a drive connection between the shaft and member comprising, an elongate, bendable spring member cantilever mounted at one end to either the shaft or the member, and an arm secured to the other of said shaft and member provided with an opening to loosely receive the spring member with means mounting said arm for adjustment generally lengthwise of the spring member whereby the effective length of the spring can be varied to vary the natural frequency of the spring.

Further objects and advantages will become apparent from the following detailed description taken in connection with the accompanying drawings in which:

FIG. 1 is a front elevational view of one embodiment of a motion-transmission system with the filter;

FIG. 2 is a vertical section taken generally along the line 2—2 in FIG. 1 and on an enlarged scale;

FIG. 3 is a vertical section taken generally along the line 3—3 in FIG. 1 and on an enlarged scale;

FIG. 4 is a vertical section taken generally along the line 4—4 in FIG. 2;

FIG. 5 is a fragmentary front elevational view of a second embodiment of the invention; and FIG. 6 is a fragmentary plan view of the embodiment shown in FIG. 1.

While this invention is susceptible of embodiment in many different forms, there is shown in the drawings and will herein be described in detail an embodiment of the invention together with a modification thereof with the understanding that the present disclosure is to be considered as an exemplification of the principles of the invention and is not intended to limit the invention to the embodiment illustrated. The scope of the invention will be pointed out in the appended claims.

In the filter embodiment of FIGS. 1 to 4 and 6, and as shown in FIG. 1, a drive shaft 10 is journalled in bearings 11 and 12. The drive shaft 10 is driven by a mechanism including a gear 13 on the shaft. A head carrier 14 suitable for carrying sound heads, as in a tape recorder, is rotatably mounted on the drive shaft 10 for movement relative thereto by suitable ball bearings (not shown) disposed within the carrier.

In the embodiment as disclosed in FIG. 1, the drive shaft 10 rotates at a non-uniform rate due to irregular mating of gear teeth in the drive. The tolerance and errors in the gears result in momentary speed-up and decreases in speed in the drive shaft 10 which would result in a flutter of the head carrier 14 which is objectionable in a tape recorder.

In order to prevent the transmission of shock and irregularities from the drive shaft 10 to the carrier 14, a filter is provided in the drive connection between these components. The filter is also of the type suitable for general application in reducing transmission of vibration between relatively movable members.

The filter comprises a cantilever-mounted deflectable spring member 20 which is mounted for bending movement and which functions as part of a motion transmission system to cause rotation of the carrier 14 with the drive shaft 10. The spring member 20 is formed of metal or other material having a suitable modulus of elasticity in reference to the specific application and in the form shown in the drawings is formed from music wire. In order to mount the spring member 20 in a cantilever fashion, an end 21 thereof is fixed in a collar 22 attached to the drive shaft 10 with the elongate spring member extending radially of the drive shaft. The spring member 20 is operatively connected to the driven member 14 by an arm 23 having a flange 24 provided with an opening 25 which loosely receives and engages the spring member 20 at a location positioned at a distance from the attached end 21 of the spring member.

In order that the filter may absorb, with maximum effect, the frequencies tending to be transmitted to the carrier 14, the arm 23 is mounted for adjustment to have the flange 24 thereof selectively engageable with the spring member 20 at different locations along the length thereof and thus at different distances from the location of the connected end 21. This varies the natural vibration point of the spring and causes the spring to have a natural vibration corresponding to the transmitted frequency. If, for example, the frequency of vibrations tending to be transmitted to the carrier 14 is 50 cycles per second, the arm 23 can be adjusted to have the natural vibration frequency of the spring equal 50 cycles per second which thus provides optimum dampening.

The adjustment of the arm 23 is accomplished by having a screw 30 extending through an opening in the arm 23 and threaded into a plate 31 located at the other side of an end face 32 of the carrier 14 with the screw 30 extending through an arcuate slot 33 in the face 32 of the carrier. It will thus be seen that loosening of the screw 30 permits adjustment of the arm 23 along the slot 33 with the adjusted position being maintained by tightening of the screw. In order to prevent rotation of the arm 23 and plate 31, each of these parts are provided with respective tabs 34 and 35 engageable in the slot 33.

Although the filter has been disclosed in connection with a tape recorder mechanism, the filter has other applications where it is desired to dampen the effect of irregularities in a drive transmission and also has application other than in drive transmissions for dampening the transmission of vibration. Additionally although the spring member 20 is shown as attached to the driving member, the filter is equally effective when the spring member 20 is attached to the driven member.

In order to take care of sudden start-up in operation of the device, an over-ride protector is provided in the form of a pin 40 fitted in the collar 22 and located to the rear of the spring member 20 when considered with the drive shaft 10 rotating in a clockwise direction as shown by the arrow 41 in FIG. 2. Upon start-up, the override protector 40 engages the flange 24 of the arm 23 to cause rotation of the driven member with the driving member and when the device reaches speed the spring member 20 then becomes effective to obtain the dampening action.

In the embodiment of FIGS. 1 to 4, the head carrier 14 has been shown rotatably mounted on and with respect to the drive shaft 10. In the embodiment of FIG. 5, a variation is shown in which the head carrier 14 could be mounted on a separate rotatable shaft 50 in line with the drive shaft 10. Except for this distinction, this embodiment is the same as that shown in FIGS. 1 to 4 and like reference numerals have been applied to like parts.

I claim:

1. In a motion transmission system, a gear driven drive shaft, a driven member rotatable coaxially with said shaft, and a flutter or vibration filtering drive connection between said shaft and said member comprising, a collar secured to the shaft, an elongate bendable spring member having one end mounted in the collar and extending from the collar radially of the shaft, an arm secured to said driven member with a flange provided with an opening to loosely receive said spring member anywhere along its length, part of said arm being mounted in a slot in said driven member for adjustment of the arm generally lengthwise of the spring member whereby the effective length of the spring member can be varied to vary the natural frequency of the spring.

2. In a motion transmission system, a shaft, a member rotatable coaxially with said shaft, and a drive connection between said shaft and said member for absorbing shock and irregularities comprising, an elongate bendable spring member having one end mounted on the shaft and extending from the shaft radially thereof, an arm secured to said member provided with an opening to loosely receive said spring member, and means mounting said arm for adjustment generally lengthwise of the spring member to facilitate engagement of the spring anywhere along its length by said arm opening.

3. A filter for reducing flutter in a motion transmission mechanism having a drive member with irregularities in its movement and a driven member driven by the drive member, said members having a common axis of rotation, one of said members having a collar and the other having a plate disposed parallel to said collar, an elongate straight wire spring carried by the collar with one end mounted in said collar and the remainder of the arm extending in a cantilever fashion from the collar radially of said axis of rotation, an arm mounted on said plate having an aperture receiving said spring, means on said plate and arm guiding said arm from movement relative to the plate and lengthwise of the spring to tune said spring to the frequency of the irregularities encountered, coacting means on the arm and plate to lock said arm in adjusted position, and an override protector comprising a pin affixed to said collar adjacent said spring for engagement with said arm on start-up.

References Cited in the file of this patent
UNITED STATES PATENTS

| | | |
|---|---|---|
| 1,659,311 | Candee | Feb. 14, 1928 |
| 2,263,987 | Finch | Nov. 25, 1941 |
| 2,857,766 | Allison et al. | Oct. 28, 1958 |
| 2,951,374 | Summers | Sept. 6, 1960 |

FOREIGN PATENTS

| | | |
|---|---|---|
| 81,246 | Sweden | Aug. 21, 1934 |